United States Patent
Magudilu Vijavaraj et al.

(10) Patent No.: US 10,838,884 B1
(45) Date of Patent: Nov. 17, 2020

(54) MEMORY ACCESS QUALITY-OF-SERVICE REALLOCATION

(71) Applicant: Apple Inc., Cupertino, CA (US)

(72) Inventors: Thejasvi Magudilu Vijavaraj, Santa Clara, CA (US); Sukalpa Biswas, Fremont, CA (US); Lakshmi narasimha murthy Nukala, Pleasanton, CA (US); Gregory S. Mathews, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/355,193

(22) Filed: Mar. 15, 2019

Related U.S. Application Data

(60) Provisional application No. 62/730,358, filed on Sep. 12, 2018.

(51) Int. Cl.
*G06F 13/16* (2006.01)
*G06F 9/50* (2006.01)

(52) U.S. Cl.
CPC .......... *G06F 13/161* (2013.01); *G06F 9/5016* (2013.01); *G06F 13/1668* (2013.01); *G06F 2209/5011* (2013.01)

(58) Field of Classification Search
CPC ... G06F 13/161; G06F 9/5016; G06F 13/1668
See application file for complete search history.

(56) References Cited

U.S. PATENT DOCUMENTS

| | | |
|---|---|---|
| 6,704,821 B2 | 3/2004 | Scandurra et al. |
| 2006/0123169 A1 | 6/2006 | Chai et al. |
| 2012/0069034 A1* | 3/2012 | Biswas ............... G06F 13/1668 345/531 |
| 2014/0056149 A1* | 2/2014 | Mani ...................... H04L 47/10 370/235.1 |
| 2015/0293709 A1 | 10/2015 | Quach et al. |
| 2016/0098375 A1 | 4/2016 | Pean et al. |
| 2017/0004097 A1 | 1/2017 | Lunadier et al. |
| 2018/0275923 A1* | 9/2018 | Earhart ................ G06F 3/0613 |

* cited by examiner

*Primary Examiner* — Larry T Mackall
*Assistant Examiner* — Michelle T Bechtold
(74) *Attorney, Agent, or Firm* — Kowert, Hood, Munyon, Rankin & Goetzel, P.C.

(57) ABSTRACT

A memory controller circuit coupled to multiple memory circuits may receive requests to access particular locations within the multiple memory circuits. A request may be assigned a particular quality-of-service level. During operation, the memory controller circuit may reallocate the quality-of-service level of a particular request to a new quality-of-service level based on accumulated bandwidth credits associated with the new quality-of-service level.

14 Claims, 10 Drawing Sheets

MEMORY ACCESS QUALITY-OF-SERVICE REALLOCATION

PRIORITY INFORMATION

This application claims the benefit of U.S. Provisional Application No. 62/730,358, filed on Sep. 12, 2018, which is incorporated by reference herein in its entirety.

BACKGROUND

Technical Field

The embodiments described herein generally relate to memory access within computing systems, and more particularly, to modifying quality-of-service levels of memory access requests.

Description of the Relevant Art

Computing systems including systems-on-a-chip (SoCs), include processors and multiple memory circuits that store software programs or applications, as well as data being operated on by the processors. Such memory circuits may vary in storage capacity as well as access time. In some computing systems, some memory circuits are coupled to the processors via a memory controller circuit communicating with the processors via a communication link or other communication network.

During operation, the processors, which may include processor cores, graphics processors, and the like, transmit requests for access to the memory controller via the communication link. Such requests may include requests to retrieve previously stored data from the memory circuits or requests to store new data in the memory circuits. The memory controller receives the requests and arbitrates access to the memory circuits for the requests based on various criteria. Upon relaying a particular request from a processor to the memory circuits, the memory controller circuit waits until the memory circuits have completed the particular request, at which point the memory controller circuit sends an acknowledge signal and, in the case of a read access, requested data to the processor that initiated the request.

SUMMARY OF THE EMBODIMENTS

Various embodiments of a computing system are disclosed. Broadly speaking, an apparatus and a method are contemplated, in which a memory controller circuit may be configured to receive a plurality of memory access requests that includes a particular memory access request is assigned a given quality-of-service level, and that specifies access to a particular location in a given one of a plurality of memory circuits. The memory controller circuit may be further configured to, in response to a determination that a number of accumulated bandwidth credits associated with the given quality-of-service level satisfies a threshold value, reallocate, to the given quality-of-service level, a different memory access request of the plurality of memory access requests that was previously assigned a different quality-of-service level less than the given quality-of-service level. In one embodiment, the different memory access request was previously identified for quality-of-service reallocation. In another non-limiting embodiment, the memory controller circuit may be further configured to accumulate bandwidth credits associated with the given quality-of-service and assign an accumulated bandwidth credit to a particular credit pool of a plurality of credit pools.

Figure 1:
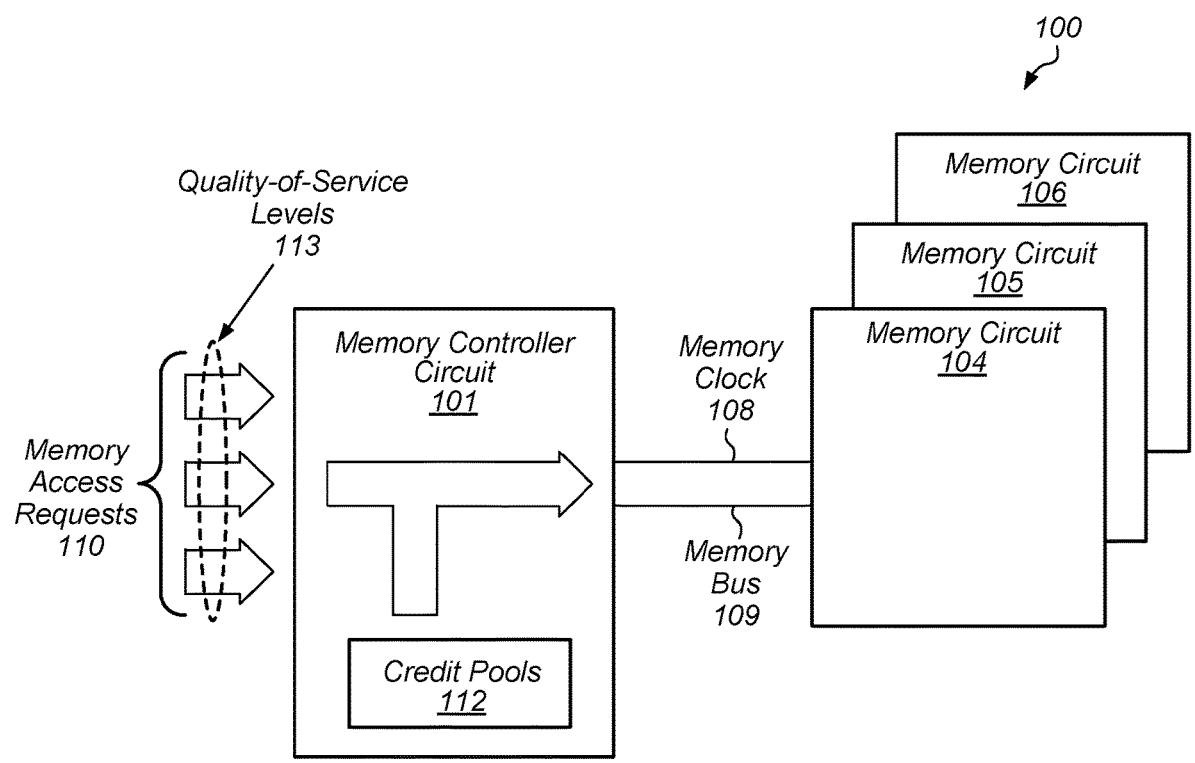
FIG. 1 is a generalized block diagram illustrating an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

During operation of a computing system, processors, processor cores, and other processing circuits generate requests to access memory (commonly referred to as "memory access requests" or "memory access transactions"). Such requests may be to store data into a memory circuit, retrieve program instructions, retrieve data for further processing, retrieve data for display, speculative retrieval of program instructions or data to fill cache memories, and the like. Depending on the type of information being stored or retrieved, or the purpose for which retrieved information is being used, a priority level may be assigned a particular memory access request through the use of virtual channels, which specific a quality-of-service level for the particular memory access request.

A computer system may assign limits of different priority levels to ensure that memory bandwidth demands associated with the highest priority level are satisfied. In some cases, however, some lower priority memory access requests may be granted limited memory bandwidth, which can adversely effect system performance causing a processor or processor core to wait for needed data or instructions. During operation, situations arise where there are insufficient memory access requests at a particular priority level to make full use of the bandwidth for the particular priority level, resulting in periods of little memory activity. The embodiments illustrated in the drawings and described below may provide techniques for reallocating a portion of unused bandwidth designated for one priority level to memory access requests with a lower priority, thereby improving memory utilization and improving performance of the computer system.

An embodiment of a computer system is illustrated in FIG. 1. As illustrated, computer system 100 includes memory controller circuit 101 and memory circuits 104-106. Memory controller circuit 101 is coupled to memory circuits 104-106 via memory clock 108 and memory bus 109. In various embodiments, memory controller circuit 101 and memory circuits 104-106 may exchanges commands and data using memory clock 108 and memory bus 109 in accordance with a communication protocol, such as, e.g., the synchronous double data rate (DDR) interface standard, or any other suitable communication protocol.

Memory controller circuit 101 is configured to receive a plurality of memory access requests, wherein a particular memory access request specifies access to a particular location in a given one of the plurality of memory circuits and is assigned a given quality-of-service level.

Memory access requests, such as those included in memory access requests 110 may be associated with different types of operations. For example, some memory access requests may have specific latency needs (commonly referred to as "low latency traffic" or "LLT"), while other memory access requests may have specific bandwidth needs (commonly referred to as "real time" or "RT" transactions). In some cases, memory access requests that do not have specific needs may be classified as "bulk transactions."

To communicate the various needs of memory access requests to memory controller circuit 101, each of memory access request 110 be assigned to a particular virtual channel, each of which is associated with a particular one of quality-of-service levels 113. As used and described herein a quality-of-service level refers to a priority level assigned to a particular memory access requests. For example, memory access requests assigned to a RT virtual channel may have a higher quality-of-service level than memory access requests assigned to an LLT virtual channel or bulk channel.

Memory controller circuit 101 is also configured to, in response to a determination that a number of accumulated bandwidth credits associated with the given quality-of-service satisfies a threshold value, reallocate, to the given quality-of-service, a different memory access request of the plurality of memory access requests that was previously assigned a different quality-of-service less than the given quality-of-service.

To manage the access to memory circuits 104-106, memory controller circuit 101 employs bandwidth credits (or simply "credits") stored in credit pools 112. As used and described herein a bandwidth credit refers to a token that allows memory controller circuit 101 to send a particular memory access request with a particular quality-of-service level to memory circuits 104-106. If there are no bandwidth credits available in credits pools 112, then memory controller circuit 101 cannot send any memory access requests to memory circuits 104-106. As described below in more detail, credits pools 112 may include multiple credits pools, each of which may store credits for a particular types of memory access requests, such as, e.g., read or write accesses, and for different quality-of-service levels.

By employing credits, memory controller circuit 101 may prevent a processor, processor core, or other agent that generates memory access requests from consuming the all of the bandwidth to memory circuits 104-106. For example, by allotting a particular number of credits to a given quality-of-service level, once those credits have been consumed, memory access requests associated with other quality-of-service levels may be sent to memory circuits 104-106.

In some cases, memory access requests may be sent by a processor or other agent to memory controller circuit 101 with a lower quality-of-service level than desired in order to prevent a situation where all of the bandwidth to memory circuits 104-106 is consumed by transactions associated with a particular quality-of-service level. For example, some LLT transactions may be sent using the bulk quality-of-service level. In such cases, the memory access requests sent with the lower quality-of-service level may be tagged as being available for reallocation. The process is commonly referred to as providing a "hint." Memory controller circuit 101 can use such hints to reallocate memory access requests to higher quality-of-services levels when there are a threshold number of unused credits available for the higher quality-of-service levels, thereby allowing the memory access requests with the hints to be given higher priority in scheduled memory access requests for processing. The reallocation process may continue until a threshold number of memory access requests have been reallocated, at which point, normal operation resumes.

As credits are used to send memory access requests to memory circuits 104-106, a number of available credits may be replenished either by memory controller circuit 101 or another circuit external to memory controller circuit 101. As described below in more details, new credits may be generated based on a timing window and then assigned to one of various credit pools included in credit pools 112.

Each memory circuits 104-106 may be particular embodiments of various types of memory circuits. For example, memory circuits 104-106 may be dynamic random-access memories (DRAMs), static random-access memories (SRAMs), flash memories, magnetoresitive memories (MRAMs), or any other suitable type of memory circuit configured to store data for later retrieval. It is noted that although only three memory circuits are depicted in the embodiment of FIG. 1, in other embodiments, any suitable number of memory circuits may be employed.

Figure 2:
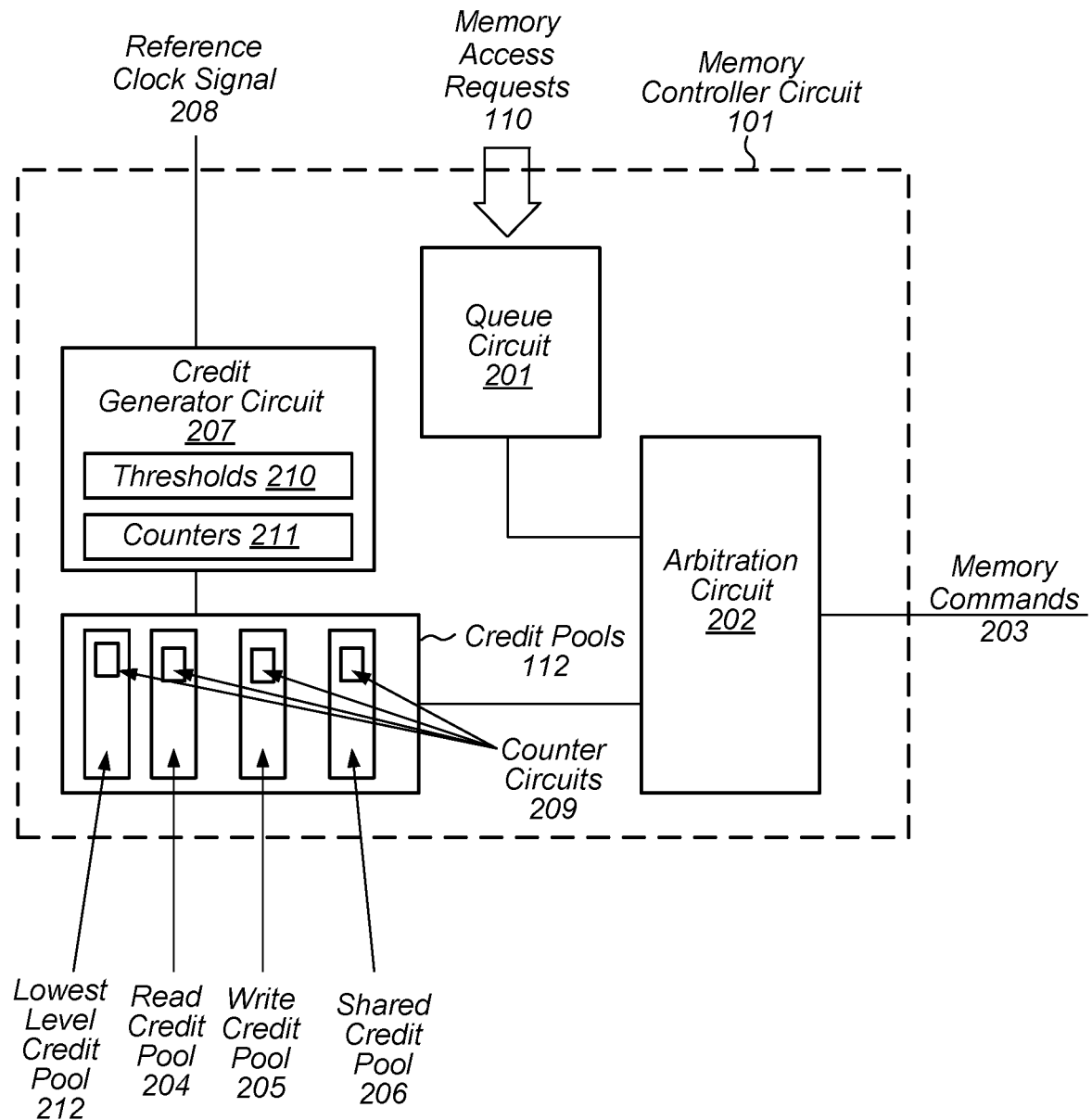
FIG. 2 illustrates a block diagram depicting an embodiment of a memory controller circuit.

A block diagram of memory controller circuit 101 is illustrated in FIG. 2. As illustrated, memory controller circuit 101 includes queue circuit 201, arbitration circuit 202, credit pools 112, and credit generator circuit 207.

Queue circuit 201 may be a particular embodiment of a register file or other suitable storage circuit configured to store memory access requests 110 as they are received. In addition to storing the requests themselves, queue circuit 201 may store additional information with the memory access requests, including specified quality-of-service levels, and hint information to be used during reallocation as described above.

Arbitration circuit 202 may be a particular embodiment of a state machine or other sequential logic circuit and is configured to determine an order in which memory access requests 110 will be retrieved from queue circuit 201, converted into memory commands 203, and send to memory circuits 104-106. In various embodiments, arbitration circuit 202 may determine the order using credits stored in credit pools 112 as well as other criteria including the relative ages of the memory access requests, and the like.

Credit pools 112 includes read credit pool 204, write credit pool 205, shared credit pool 206, and lowest level credit pool 212. Each of read credit pool 204, write credit pool 205, shared credit pool 206, and lowest level credit pool 212 include one or more of counter circuits 209, which are used to track a number of available credits for the different types of transactions. For example, counter circuits included in read credit pool 204 track a number of credits available for read memory access requests, and counter circuits included in write credit pool 205 track a number of credits available for write memory access requests. The number of credits tracked by counters in shared credit pool 206 may be used for either read or write memory access requests and the number of credits tracked by counters in lowest level credit pool 212 may be used for promoting transactions with a lowest quality-of-service level to higher quality-of-service levels. As credits are consumed, the counters may be decremented, and as the credit pools are refilled, the counters may be incremented.

Within a given one of read credit pool 204, write credit pool 205, and shared credit pool 206, different counters may track the number of available credits for different quality-of-service levels. For example, within read credit pool 204, three different counters may track respective number of available credits for read memory access requests with RT, LLT, and bulk quality-of-service levels. In various embodiments, counters included lowest level credit pool 212 may track an available number of credits to promote bulk with hint quality-of-service level transactions.

As credits are consumed in scheduling memory access requests for processing, each of read credit pool 204, write credit pool 205, and shared credit pool 206 are refilled with credits according to one of various methods. Credit generator circuit 207, which may be a particular embodiment of a state machine or other sequential logic circuit, is configured to generate credits during a timing window based on thresholds 210. In various embodiments, counters 211 may track a number of cycles of either memory clock 108 or reference clock signal 208 to determine when the timing window has concluded. A width of the timing window may be adjusted based on bandwidth of memory circuits 104-106 or other suitable criteria.

Credit generator circuit 207 may generate different numbers of credits for use with memory access requests assigned to different quality-of-service levels. The number of credits designated for a particular quality-of-service level may be set based on thresholds 210. For example, 20% of generated credits during a particular timing window may be designated for LLT transactions. In some cases, thresholds 210 may be adjusted during operation based on performance of the computer system. As credits are generated, they be assigned to different ones of the credit pools included in credit pools 112. For example, 50% of the generated credits may be assigned to read credit pool 204 and the remaining 50% of the generated credits may be assigned to write credit pool 205.

As described below in more detail, when the generated credits cannot be assigned to either read credit pool 204 or write credit pool 205 due to the credit pools being full, the generated credits may be assigned to shared credit pool 206. Credits stored in shared credit pool 206 may be used to allow scheduling of either read or write operations when read credit pool 204 and write credit pool 205 have been depleted for a particular turn. As used and described herein, a turn is a collection of read and write transactions that are performed within a particular period of time.

As credits are added to shared credit pool 206, the number of credits in shared credit pool 206 are compared to a threshold value. When the number of credits stored in shared credit pool 206 exceed the threshold value, subsequent credits are assigned to lowest level credit pool 212. As described in more detail below, credits in lowest level credit pool 212 may be used to schedule transactions with a lowest quality-of-service level, such as, e.g., bulk transactions, by promoting them to a higher quality-of-service level. Credits may be stored in the lowest level credit pool 212 up to a different threshold value.

As described below in more detail, when scheduling transactions for a next turn, if there are insufficient transactions to consume available slots within the turn for a particular quality-of-service level, lower quality-of-service level transactions may be promoted to the particular quality-of-service level based on a number of credits available in lowest level credit pool 212. For example, if there are insufficient LLT transactions to consume all slots available for LLT transactions within a turn, one or more bulk transactions may be promoted to a LLT quality-of-service level for the purposes of scheduling. It is noted that, in various embodiments, only low quality-of-service level transactions that are identified with a hint may be promoted to the higher quality-of-service level. In some cases, a number of transactions that may be promoted within a given turn may be limited by a threshold value.

It is noted that the embodiment depicted in FIG. 2 is merely an example and that other circuits blocks, such as, e.g., timing generator circuits for memory clock 108, have been omitted for clarity.

Figure 3:
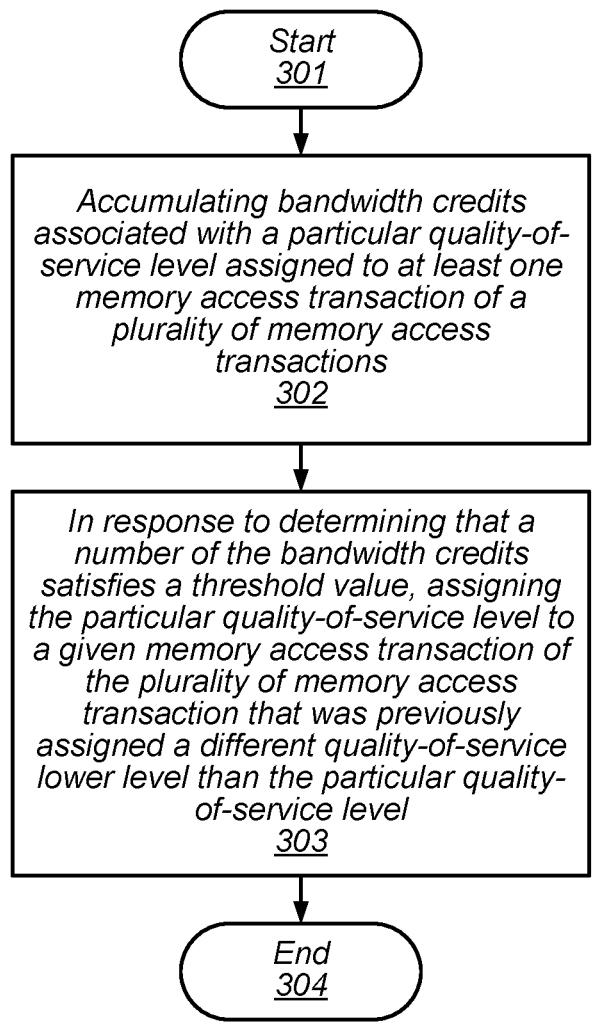
FIG. 3 illustrates a flow diagram depicting an embodiment of a method for operating a memory controller circuit.

Turning to FIG. 3, a flow diagram depicting an embodiment of a method for operating a memory controller circuit is illustrated. The method, which begins in block 301, may be applied to memory controller circuit 101, or any other suitable memory controller circuit configured to operate in a similar fashion.

The method includes accumulating bandwidth credits associated with a particular quality-of-service level assigned to at least one memory access transaction of a plurality of memory access transactions (block 302). As described below in more detail, a received bandwidth credit may be assigned to one of various pools of bandwidth credits (or simply "pools"). In some cases, one pool may accumulate bandwidth credits to be used with read transactions, and another pool may accumulate bandwidth credits to be used with write transactions. A shared pool of accumulated credits that can be used for both read and write transactions may also be used. As bandwidth credits are received, different algorithms may be used, as illustrated below, to assign a particular received bandwidth credit to one of the pools.

The method also includes, in response to determining that a number of bandwidth credits satisfies a threshold value, assigning the particular quality-of-service level to a given memory access transaction of the plurality of memory access transactions that was previously assigned to a different quality-of-service level lower than the particular quality-of-service level (block 303).

In various embodiments, the given memory access transaction may have been previously identified for quality-of-service level reallocation. As described above, such identification may be provided as part of the memory access transactions as a hint. In some cases, such a hint may be encoded in a data field included in the given memory access transaction. In some cases, a memory controller circuit, such as, e.g., memory controller circuit 101, may decode data bits included in the data field to determine if the given memory access transaction has been identified for possible reallocation and, if so, to what quality-of-service level the given memory access transactions should be reallocated. The method concludes in block 304.

It is noted that the embodiment of the method illustrated in the flow diagram of FIG. 3 is merely an example. In other embodiments, different numbers of credit pools and different method for assigning bandwidth credits to the credit pools may be employed.

Figure 4:
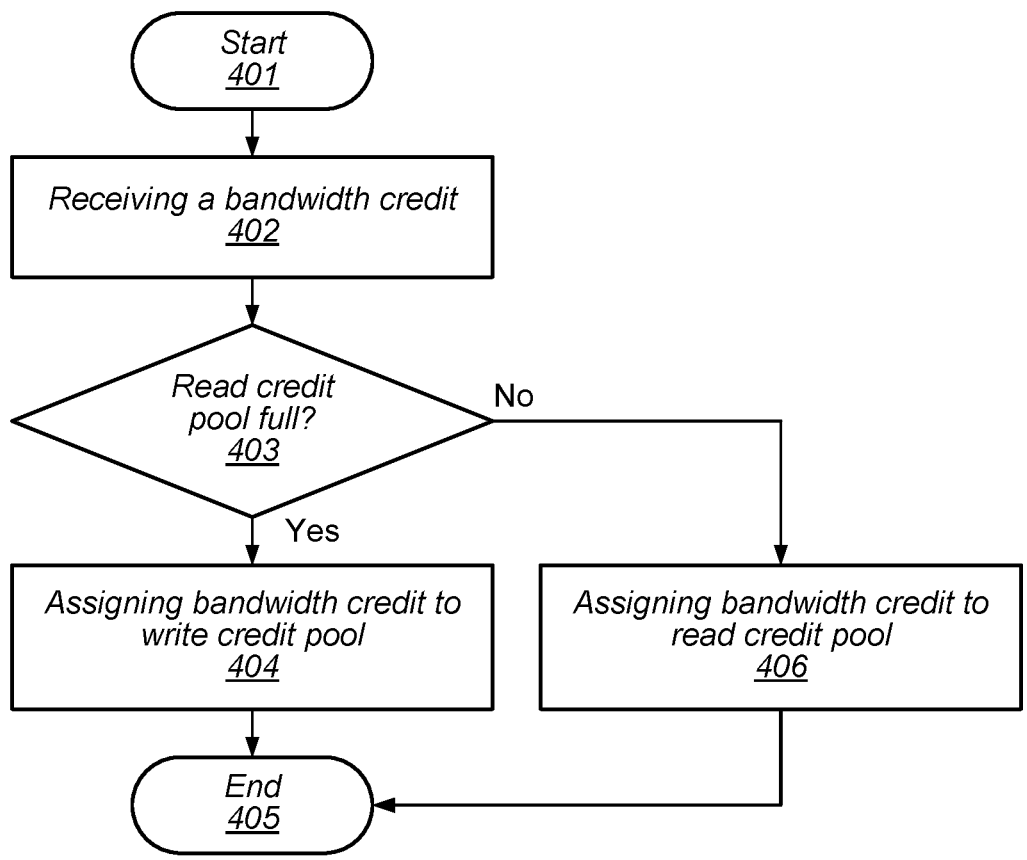
FIG. 4 illustrates a flow diagram depicting an embodiment of a method for assigning an accumulated bandwidth credit to a credit pool.

As described above, a memory controller circuit may assign accumulated bandwidth credits to one of multiple credit pools based on different criteria. A flow diagram depicting an embodiment of a method for assigning an accumulated bandwidth credit to a credit pool is illustrated in FIG. 4. In various embodiments, the method, which begins in block 401, may correspond to block 302 of the flow diagram depicted in FIG. 3.

The method includes receiving a bandwidth credit (block 402). As described below, multiple bandwidth credits may be generated within a given period of time (or "window"), which is based on a timing reference such as a clock signal, for example. In various embodiments, different numbers of bandwidth credits may be generated for different quality-of-service levels during a window. It is noted that a memory controller circuit, such as, e.g., memory controller circuit 101 may include circuitry configured to generate the bandwidth credits. Alternatively, circuitry external the memory controller circuit may be configured to generate the bandwidth credits. The method then depends on a state of a read credit pool, such as read credit pool 204, for example (block 403).

If the read credit pool is full, then the method includes assigning the bandwidth credit to a write credit pool, such as write credit pool 205, for example (block 404). In some cases, the assigning the bandwidth credit to the write credit pool may include incrementing one of multiple counter circuits that corresponds to the particular quality-of-service level associated with the bandwidth credit. To determine if the read credit pool is full, values of the multiple counters may be compared to respective threshold values. Based on results of the comparison, the memory controller circuit determines if the read credit pool is full. It is noted that in some embodiments, the threshold values may be programmable and may be adjusted based on performance of a computer system which includes the memory controller circuit. The method may then conclude in block 405.

Alternatively, the read credit pool is not full, then the method includes assigning the bandwidth credit to the read credit pool (block 406). As with adding a bandwidth credit to the write credit pool, adding a credit to the read credit pool may include incrementing a particular counter of multiple counters included in the read credit pool, where the particular counter corresponds to the quality-of-service level of the bandwidth credit. The method may then conclude in block 405.

Figure 5:
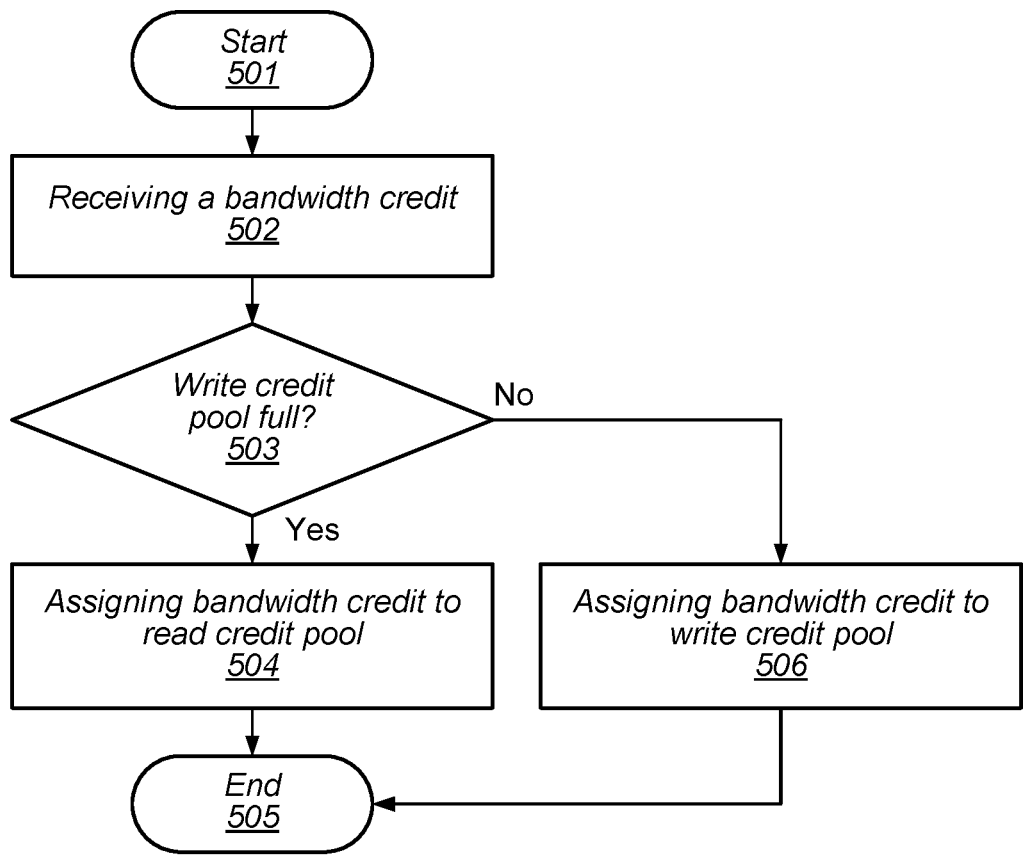
FIG. 5 illustrates a flow diagram depicting another embodiment of a method for assigning an accumulated bandwidth credit to a credit pool.

Turning to FIG. 5, a flow diagram depicting another embodiment of a method for assigning bandwidth credits to credit pools. The method, which begins in block 501, may be applied to memory controller circuit 101 or any other suitable memory controller circuit.

The method includes receiving a bandwidth credit (block 502). As described above in regard to FIG. 4, the bandwidth credit may be associated with a particular quality-of-service level and may be generated by a memory controller circuit or other suitable circuit block within a particular window. The method may then depend on a state of a write credit pool, such as write credit pool 205, for example (block 503).

If the write credit pool is full, then the method includes assigning the bandwidth credit a read credit pool, such as read credit pool 204, for example (block 504). In some cases, the assigning the bandwidth credit to the read credit pool may include incrementing one of multiple counter circuits that corresponds to the particular quality-of-service level associated with the bandwidth credit.

In a similar fashion to what was described in regard to FIG. 4, to determine if the write credit pool is full, values of the multiple counters may be compared to respective threshold values. Based on results of the comparison, the memory controller circuit determines if the write credit pool is full. It is noted that in some embodiments, the threshold values may be programmable and may be adjusted based on performance of a computer system which includes the memory controller circuit. The method then concludes in block 505.

Alternatively, the write credit pool is not full, then the method includes assigning the bandwidth credit to the write credit pool (block 506). As with adding a bandwidth credit to the read credit pool, adding a credit to the write credit pool may include incrementing a particular counter of multiple counters included in the write credit pool, where the particular counter corresponds to the quality-of-service level of the bandwidth credit. The method may then conclude in block 505.

In some cases, both the read credit pool and write credit pool may be full. To accommodate such a situation, additional credit pools may be used as described above. An embodiment of a method for assigning bandwidth credits with more than two credit pools is depicted in the flow diagram of FIG. 6. The method, which begins in block 601, may be applied to memory controller circuit 101 or any other suitable memory controller circuit.

As with the methods described in FIG. 4 and FIG. 5, the method includes receiving a bandwidth credit (block 602). The bandwidth credit may be generated internally or externally to the memory controller circuit and may be based on a timing signal and threshold values associated with respective quality-of-service levels.

The method includes checking a status of the read and write credit pools (block 603). For example, memory controller circuit 101 may compare contents of counter circuits 209 associated with read credit pool 204 and write credit pool 205 to respective threshold values. The method may then depend on the whether the read and write credit pools are full (block 604).

If there is space available in the read credit pool or the write credit pool, then the method includes adding the credit to either read or write credit pool (block 609). In various embodiments, the addition of the credit to either the read or write credit pool may be accomplished using the methods depicted in the flow diagrams of FIGS. 4 and 5. The method may then conclude in block 608.

Alternatively, if there is insufficient space in read credit pool and the write credit pool, the method includes checking a status of a shared credit pool (block 605). In various embodiments, memory controller circuit 101 may compare a value of one of counter circuits 209 corresponding to shared credit pool 206 to a threshold value. The method may then depend upon whether the shared credit pool is full (block 606).

If the shared credit pool is not full, then the method may include adding the credit to the shared credit pool (610). In various embodiments, a counter circuit associated with the shared credit pool may be incremented in response to the addition of the credit. The method may then conclude in block 608.

Alternatively, if the shared credit pool is full, then the method includes adding the credit to a lowest level credit pool (block 607). As with the other credit pools, adding the credit to the lowest level credit pool may include incrementing a counter circuit associated with the lowest level credit pool. Once the credit has been added to the lowest level credit pool, then method may conclude in block 608.

Figure 6:
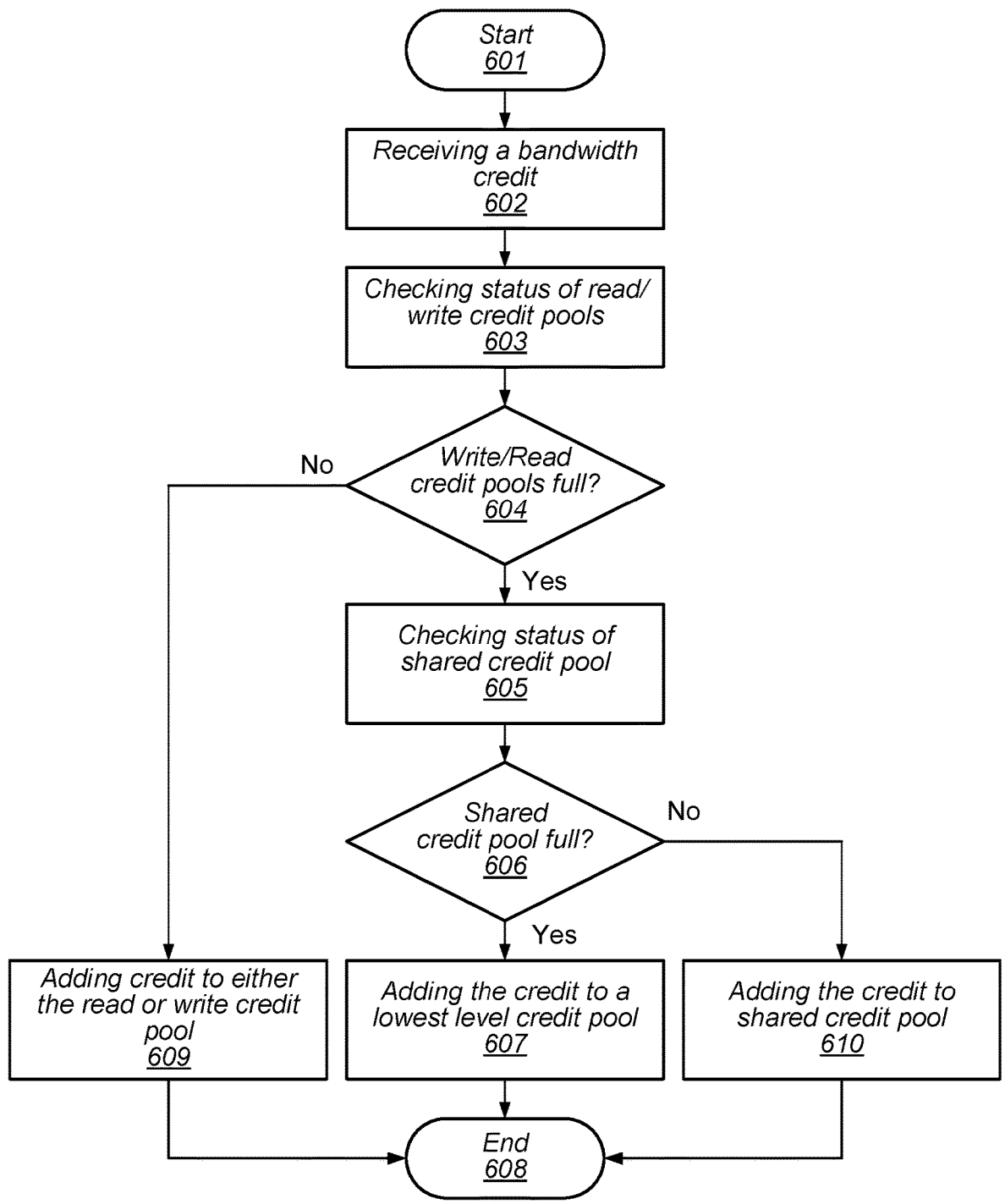
FIG. 6 illustrates a flow diagram depicting an embodiment of a method for assigning an accumulated bandwidth credit to a shared credit pool and a lowest level credit pool.

It is noted that the embodiment of the method illustrated in FIG. 6 is merely an example. In other embodiments, additional numbers of credit pools may be employed. For example, other credit pools associated with other quality-of-service levels may be included to collect credits that cannot be stored in the shared credit pool.

As mentioned above, a number of bandwidth credits are generated during a timing window and assigned to various credits pools using methods similar to those described above in regard to FIG. 4, FIG. 5, and FIG. 6 in order to refill the credit pools. An embodiment of a method for generating such bandwidth credits is illustrated in the flow diagram depicted in FIG. 7. The method, which begins in block 701, may be applied to memory controller circuit 101 or any other suitable circuit configured to generate bandwidth credits. It is noted that the creation of bandwidth credits may be performed by the memory controller circuit or by a circuit external to the memory controller circuit.

The method includes checking a timing window (block 702). In various embodiments, the duration of the timing window may be determined using a timing or clock signal, such as memory clock 108, for example. In cases when memory clock 108 is active, a reference clock signal, such as, e.g., reference clock signal 208, may be used to determine the duration of the timing window to allow bandwidth credits to accumulate during periods when the communication between the memory controller circuit and memory circuits has been suspended. In some embodiments, a counter circuit may be employed to track a number of cycles of the timing or clock signal and compare the tracked number of cycles to a programmable threshold value. The threshold value may, in some embodiments, be based on bandwidth capabilities of the memory circuits coupled to the memory controller circuit. The method may then depend on if the end of a timing window has been detected (block 703).

If an end of the timing window is not detected, then the method includes generating bandwidth credits using a timing signal and thresholds (block 704). In various embodiments, a respective number of bandwidth credits may be generated for each quality-of-service level based on respective threshold values for each quality-of-service level. For example, in some cases 20% of the bandwidth credits generated during the timing window may be assigned to the quality-of-service level associated with LLT access requests. The method may then continue from block 702 as described above.

If, however, the end of the timing window is detected, then the method includes resetting for the next timing window (block 705). In some cases, resetting may include resetting counter values to zero, adjusting the threshold values, and the like. Once the resetting operations have been completed, a new timing window may be started and the method of FIG. 7 may be repeated. The method may then conclude in block 706.

Figure 7:
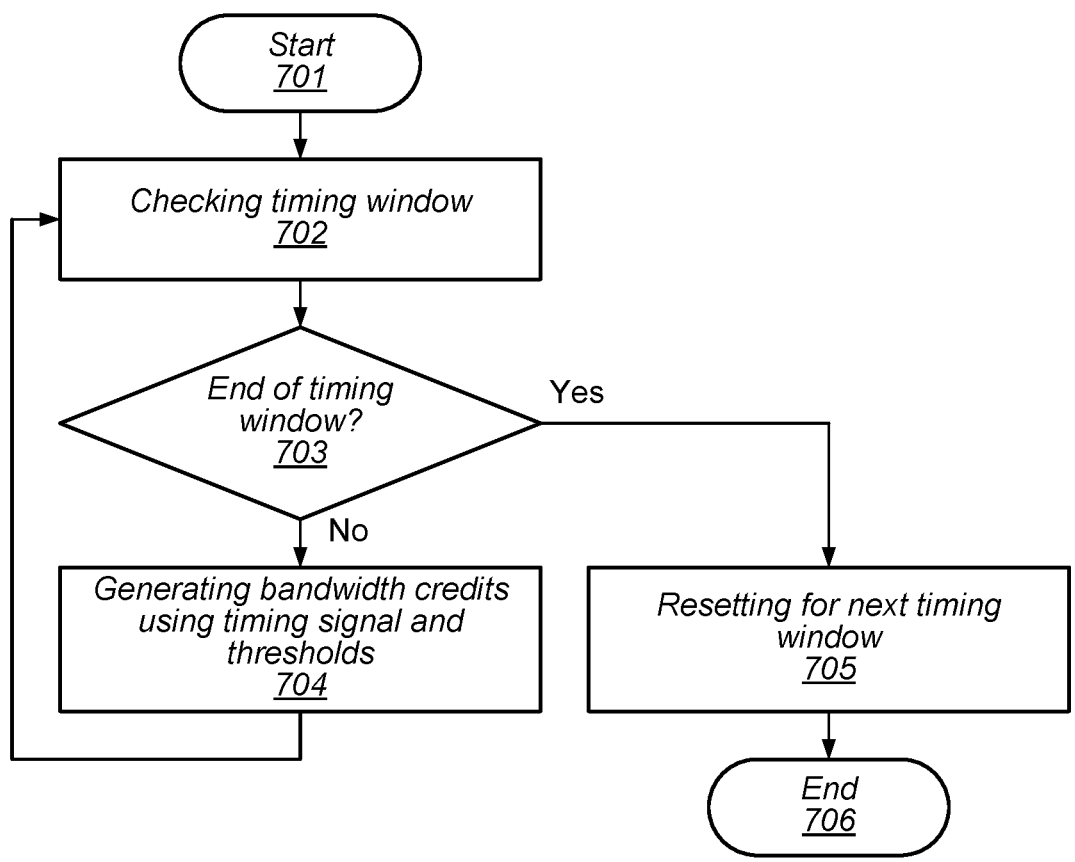
FIG. 7 illustrates a flow diagram depicting an embodiment of a method for refilling credit pools associated with a memory controller circuit.

It is noted that the embodiment of the method illustrated in FIG. 7 is merely an example. In other embodiments, different methods, such as, e.g., generating bandwidth credits based on a number of received memory access requests, may be employed.

As mentioned above, bandwidth credits are allocated to different credit pools based on various thresholds. In some cases, bandwidth credits available in a lowest level credit pool, such as, e.g., lowest level credit pool 212 as illustrated in FIG. 2, may be used advantageously in cases where there are insufficient transactions with a particular quality-of-service level assigned to a given turn to promote transactions with lower quality-of-service levels to higher quality-of-service levels. An embodiment of a method for promoting transactions is illustrated in the flow diagram of FIG. 8. The method, which begins at block 801, may be applied to memory controller circuit 101 or any other suitable memory controller circuit. In some embodiments, the method depicted in the flow diagram of FIG. 8 may be include as part of the operation described in block 303 of the embodiment illustrated in FIG. 3.

The method includes checking a number of transactions associated with a particular quality-of-service level for a next turn (block 802). For example, in some cases, memory controller will check a number of slots within the next turn assigned to transactions that have a LLT quality-of-service level. The method then depends on whether there are available slots available for transactions associated with the particular quality-of-service level (block 803).

If there are no available slots for transactions associated with the particular quality-of-service level, then the method concludes in block 808. Alternatively, the method includes checking a number of available credits in a lowest level credit pool (block 804). As described above, memory controller circuit 101 includes multiple credit pools each of which is replenished with bandwidth credits according to respective threshold values. In some cases, a lower level credit pool, such as, e.g., lowest level credit pool 212, will accumulate bandwidth credits only after a read credit pool, write credit pool, and shared credit pool are full. The method may then depend on a number of credits available in the lowest level credit pool (block 805).

If there are no credits available in the lowest level credit pool, then the method concludes in block 808. Alternatively, the method includes promoting a tagged transaction associated with a lower quality-of-service level to the particular quality-of-service level (block 806). For example, a quality-of-service level of a tagged transaction with a bulk quality-of-service level may be modified to a LLT quality-of-service level. It is noted that, in some embodiments, transactions associated with the bulk quality-of-service level can be promoted only if they are tagged with a hint or otherwise identified as being eligible for the promotion.

The method also includes assigning the promoted transaction to a slot in the next turn (block 807). By assigning the promoted transaction to a slot in the next turn, bandwidth designated for the particular quality-of-service level that would otherwise go unused, can be used for lower quality-of-service level transactions, thereby improving memory circuit utilization. The method then concludes in block 808.

Figure 8:
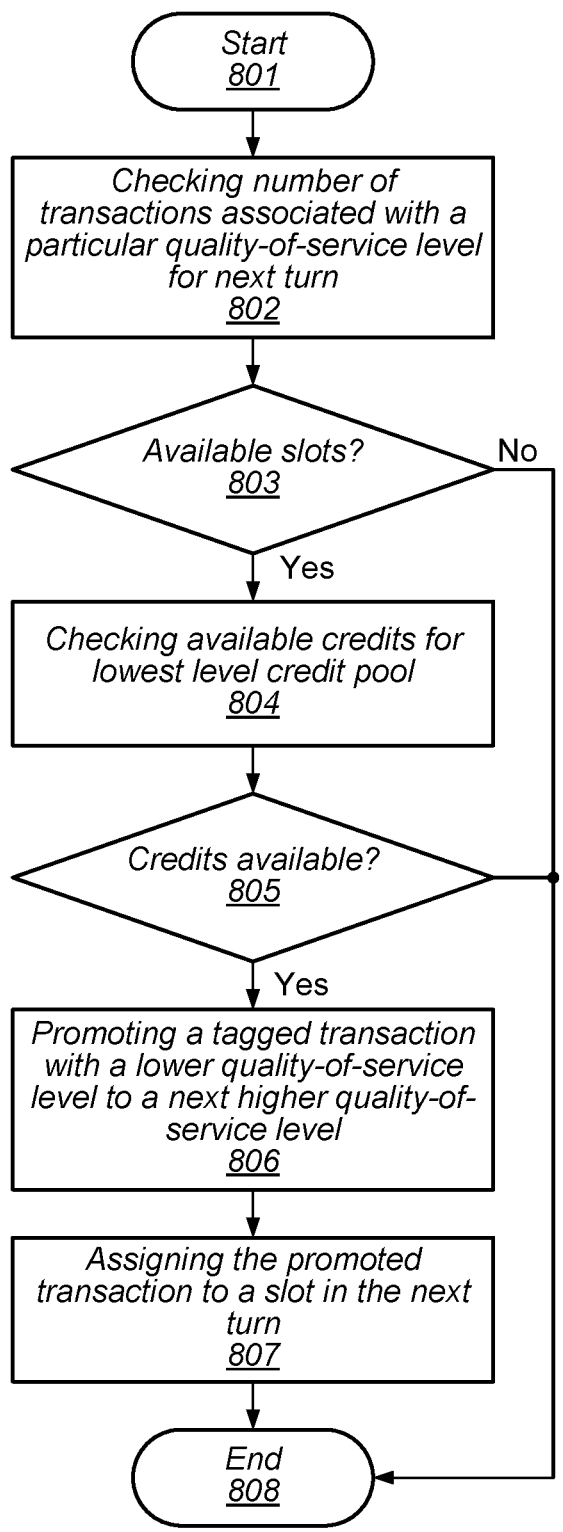
FIG. 8 illustrates a flow diagram depicting an embodiment of a method for promoting a transaction with a particular quality-of-service level to a higher quality-of-service level.

It is noted that the embodiment of the method illustrated in the flow diagram of FIG. 8 depicts the promotion and assignment of a single transaction. In other embodiments, the method depicted in the flow diagram of FIG. 8 may be repeatedly performed until all available slots in the next turn have been utilized.

Figure 9:
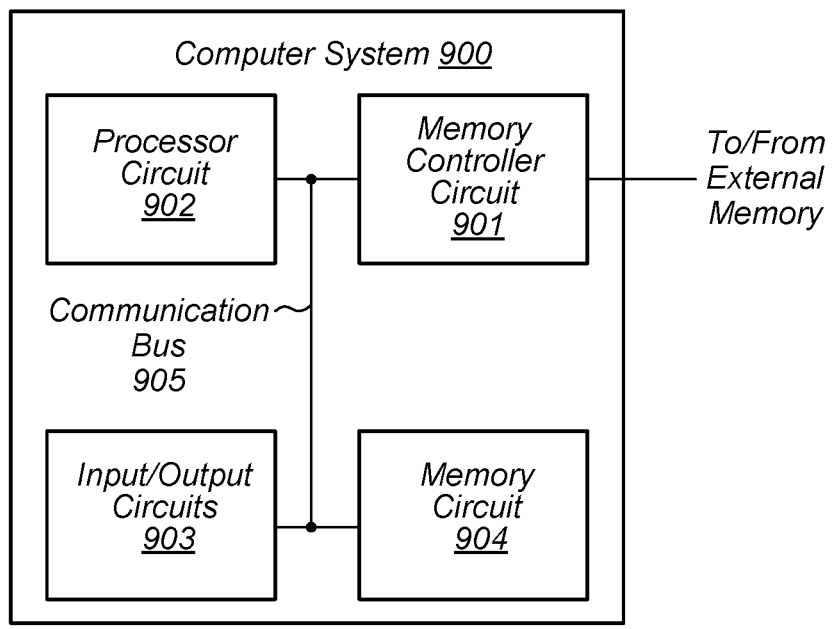
FIG. 9 depicts a block diagram of an embodiment of system-on-a-chip.

A block diagram of computer system is illustrated in FIG. 9. In the illustrated embodiment, the computer system 900 includes memory controller circuit 901, processor circuit 902, input/output circuits 903, and memory circuit 904, each of which may be configured to send requests and data (collectively transactions) the other circuit blocks using communication bus 905. In various embodiments, computer system 900 may be configured for use in a desktop computer, server, or in a mobile computing application such as, e.g., a tablet, laptop computer, or wearable computing device. Although four circuit blocks are depicted in the embodiment of FIG. 9, in other embodiments, any suitable number of circuit blocks may be included in computer system 900.

Memory controller circuit 901 is configured to schedule memory access requests to external memory. In various embodiments, memory controller circuit 901 may correspond to memory controller 101 as illustrated in FIG. 1, and the memory access requests may include both memory read access requests and memory write access requests. Such access requests may be received from processor circuit 802, input/output circuits 803, or any other suitable circuit block included in computer system 800 (not shown).

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 904 may include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 9, a single memory circuit is depicted. In other embodiments, any suitable number of memory circuits may be employed.

Input/output circuits 903 may be configured to coordinate data transfer between computer system 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 903 may be configured to implement a version of Universal Serial Bus (USB) protocol or IEEE 1394 (Firewire®) protocol.

Input/output circuits 903 may also be configured to coordinate data transfer between computer system 900 and one or more devices (e.g., other computing systems or integrated circuits) coupled to computer system 900 via a network. In one embodiment, input/output circuits 903 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 903 may be configured to implement multiple discrete network interface ports.

Figure 10:
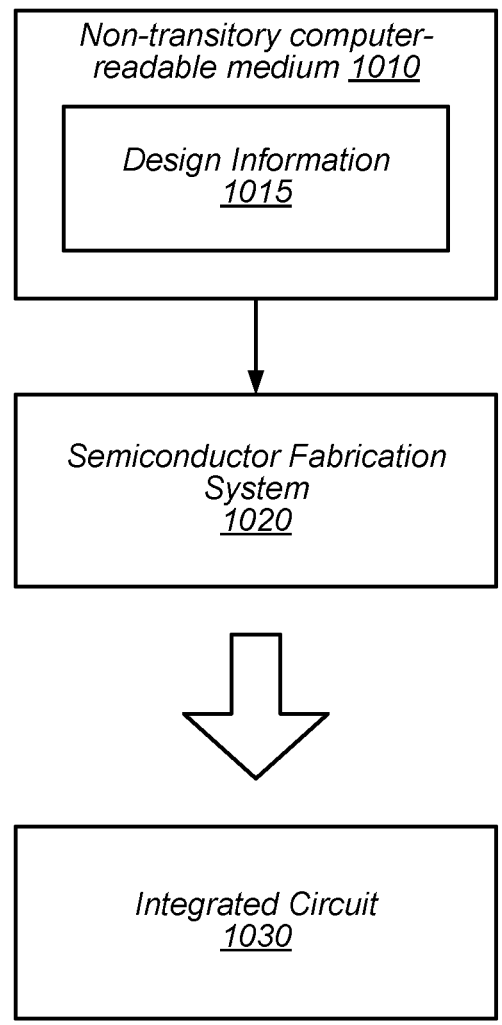
FIG. 10 illustrates a block diagram of a computer-readable medium storing design information for an integrated circuit.

FIG. 10 is a block diagram illustrating an example non-transitory computer-readable storage medium that stores circuit design information, according to some embodiments. In the illustrated embodiment, semiconductor fabrication system 1020 is configured to process the design information 1015 stored on non-transitory computer-readable storage medium 910 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a plurality of memory circuits; and
a memory controller circuit configured to:
receive a plurality of memory access requests, wherein a particular memory access request specifies access to a particular location in a given one of the plurality of memory circuits and is assigned a given quality-of-service level;
accumulate bandwidth credits associated with the given quality-of-service level;
assign a given bandwidth credit of accumulated bandwidth credits to a read credit pool of a plurality of credit pools in response to a determination that a write credit pool of the plurality of credit pools is full; and
in response to a determination that a number of the accumulated bandwidth credits assigned to the read credit pool satisfies a read credit threshold value, reallocate, to the given quality-of-service level, a read memory access request of the plurality of memory access requests that was previously assigned a different quality-of-service level.

2. The apparatus of claim 1, wherein the read memory access request was previously identified for quality-of-service level reallocation.

3. The apparatus of claim 1, wherein the memory controller circuit is further configured to assign a different bandwidth credit of the accumulated bandwidth credits to the write credit pool of the plurality of credit pools, in response to a determination that the read credit pool of the plurality of credit pools is full.

4. The apparatus of claim 1, wherein the memory controller circuit is further configured to assign a particular bandwidth credit of the accumulated bandwidth credits to a shared credit pool, in response to a determination that the read credit pool and the write credit pool are both full.

5. A method, comprising:
accumulating bandwidth credits associated with a particular quality-of-service level assigned to at least one memory access transaction of a plurality of memory access transactions;
assigning a given bandwidth credit of accumulated bandwidth credits to a read credit pool of a plurality of credit pools, in response to determining that a write credit pool of the plurality of credit pools is full; and
in response to determining that a number of the bandwidth credits satisfies a threshold value, assigning the particular quality-of-service level to a given memory access transaction of the plurality of memory access transactions that was previously assigned a different quality-of-service level lower than the particular quality-of-service level.

6. The method of claim 5, wherein the given memory access transaction has been previously identified for quality-of-service level reallocation.

7. The method of claim 5, further comprising assigning a different bandwidth credit of the accumulated bandwidth credits to the write credit pool of the plurality of credit pools, in response to determining the read credit pool is full.

8. The method of claim 5, further comprising assigning a particular bandwidth credit of the accumulated bandwidth credits to a shared credit pool, in response to determining the read credit pool and the write credit pool are both full.

9. The method of claim 8, further comprising refilling the read credit pool and the write credit pool using bandwidth credits assigned to the shared credit pool.

10. A non-transitory computer-readable storage medium having design information stored thereon, wherein the design information specifies a design of at least a portion of a hardware integrated circuit in a format recognized by a semiconductor fabrication system that is configured to use the design information to produce the hardware integrated circuit according to the design information, wherein the design information specifies that the hardware integrated circuit comprises:
- a plurality of memory circuits; and
- a memory controller circuit configured to:
  - receive a plurality of memory access requests, wherein a particular memory access request specifies access to a particular location in a given one of the plurality of memory circuits and is assigned a given quality-of-service level;
  - accumulated bandwidth credits associated with the given quality-of-service level;
  - assign a given bandwidth credit of accumulated bandwidth credits to a read credit pool of a plurality of credit pools, in response to a determination that a write credit pool of the plurality of credit pools is full; and
  - in response to a determination that a number of the accumulated bandwidth credits assigned to the read credit pool satisfies a read credit threshold value, reallocate, to the given quality-of-service level, a read memory access request of the plurality of memory access requests that was previously assigned a different quality-of-service level.

11. The non-transitory computer-readable storage medium of claim 10, wherein the read memory access request was previously identified for quality-of-service level reallocation.

12. The non-transitory computer-readable storage medium of claim 10, wherein the memory controller circuit is further configured to assign a different bandwidth credit of the accumulated bandwidth credits to the write credit pool of the plurality of credit pools, in response to a determination that the read credit pool is full.

13. The non-transitory computer-readable storage medium of claim 10, wherein the memory controller circuit is further configured to assign a particular bandwidth credit of the accumulated bandwidth credits to a shared credit pool, in response to a determination that the read credit pool and the write credit pool are both full.

14. The non-transitory computer-readable storage medium of claim 13, wherein the memory controller circuit is further configured to refill, using bandwidth credits assigned to the shared credit pool, the read credit pool and the write credit pool.

* * * * *